US011535058B2

(12) United States Patent
Goncalves et al.

(10) Patent No.: US 11,535,058 B2
(45) Date of Patent: Dec. 27, 2022

(54) TIRE FOR A CIVIL-ENGINEERING VEHICLE

(71) Applicant: COMPAGNIE GENERALE DES ETABLISSEMENTS MICHELIN, Clermont-Ferrand (FR)

(72) Inventors: Olivier Goncalves, Clermont-Ferrand (FR); Jean-François Olagnon, Clermont-Ferrand (FR)

(73) Assignee: COMPAGNIE GENERALE DES ETABLISSEMENTS MICHELIN, Clermont-Ferrand (FR)

(*) Notice: Subject to any disclaimer, the term of this patent is extended or adjusted under 35 U.S.C. 154(b) by 366 days.

(21) Appl. No.: 16/625,581

(22) PCT Filed: Jun. 21, 2018

(86) PCT No.: PCT/FR2018/051510
§ 371 (c)(1),
(2) Date: Dec. 20, 2019

(87) PCT Pub. No.: WO2018/234709
PCT Pub. Date: Dec. 27, 2018

(65) Prior Publication Data
US 2020/0254815 A1 Aug. 13, 2020

(30) Foreign Application Priority Data
Jun. 22, 2017 (FR) ...................... 1755728

(51) Int. Cl.
*B60C 1/00* (2006.01)
*B60C 11/00* (2006.01)
*C08K 9/10* (2006.01)

(52) U.S. Cl.
CPC .......... *B60C 1/0016* (2013.01); *B60C 11/005* (2013.01); *C08K 9/10* (2013.01); *B60C 2200/065* (2013.01)

(58) Field of Classification Search
CPC ........ B60C 1/0016; B60C 11/005; C08K 9/10
See application file for complete search history.

(56) References Cited

U.S. PATENT DOCUMENTS

| 2013/0317137 | A1  | 11/2013 | Thomasson et al. |
| 2014/0332132 | A1* | 11/2014 | Gervais ................... B60C 11/00 152/209.5 |
| 2014/0378575 | A1* | 12/2014 | Sevignon ............. C08K 5/0016 523/156 |
| 2015/0027605 | A1* | 1/2015  | Chauvin ............. B60C 11/0309 152/209.18 |

FOREIGN PATENT DOCUMENTS

| WO | 2012080109 A1 | 6/2012 |
| WO | 2014102136 A1 | 7/2014 |
| WO | 2014161756 A1 | 10/2014 |

OTHER PUBLICATIONS

International Search Report and Written Opinion corresponding to PCT/FR2018/051510 dated Oct. 26, 2018.

* cited by examiner

*Primary Examiner* — Yung-Sheng M Tsui
(74) *Attorney, Agent, or Firm* — Dickinson Wright PLLC

(57) ABSTRACT

A tire for a heavy vehicle of civil engineering type, intended to be fitted onto a rim, is provided. The nominal diameter of the tire is at least equal to 25 inches. The tire comprises a tread having a radial thickness HT at least equal to 30 mm. The tread has a composition based on at least one diene elastomer, a reinforcing filler predominantly comprising a filler at least partially covered with silica, an agent for coupling the filler to the at least one diene elastomer and a crosslinking system. The dispersion of the filler in the elastomeric matrix has a Z score of greater than or equal to 70.

18 Claims, No Drawings

TIRE FOR A CIVIL-ENGINEERING VEHICLE

This application is a 371 national phase entry of PCT/FR2018/051510 filed on 21 Jun. 2018, which claims benefit of French Patent Application No. 1755728, filed 22 Jun. 2017, the entire contents of which are incorporated herein by reference for all purposes.

BACKGROUND

1. Technical Field

The present invention relates to a tire intended to equip heavy vehicles of civil engineering type, and more particularly to the tread of such a tire, intended to come into contact with the ground via a running surface and to be worn away.

2. Related Art

A radial tire for a heavy vehicle of civil engineering type is intended to be fitted onto a rim, the nominal diameter of which, within the meaning of the ETRTO (European Tire and Rim Technical Organisation) standard, is at least equal to 25 inches. Although not restricted to this type of application, the invention is described more particularly with reference to a radial tire of large size intended to be fitted, for example, onto a dumper, a vehicle for transporting materials extracted from quarries or opencast mines. A radial tire of large size is understood to mean a tire intended to be fitted onto a rim, the nominal diameter of which is at least equal to 49 inches and can reach 57 inches, indeed even 63 inches.

Since a tire has a geometry which exhibits symmetry of revolution about an axis of rotation, the geometry of the tire is generally described in a meridian plane containing the axis of rotation of the tire. For a given meridian plane, the radial, axial and circumferential directions respectively denote the directions perpendicular to the axis of rotation of the tire, parallel to the axis of rotation of the tire and perpendicular to the meridian plane.

In that which follows, the expressions "radially interior", respectively "radially exterior", mean "closer to", respectively "further away from", the axis of rotation of the tire. "Axially interior", respectively "axially exterior", mean "closer to", respectively "further away from", the equatorial plane of the tire, the equatorial plane of the tire being the plane passing through the middle of the running surface of the tire and perpendicular to the axis of rotation of the tire.

It is known that the treads of the tires used in civil engineering are particularly sensitive to the increase in temperature. This is because the tire tread used in civil engineering is particularly characterized by a radial thickness HT defined, by convention, as the maximum radial depth, measured in the cut-outs, at least equal to 30 mm and, especially for large civil engineering vehicles of dumper type, at least equal to 60 mm, and thus very large. In point of fact, there is a constant search to improve the properties of tires and in particular their wear resistance and, conventionally, the improvement in the wear resistance is known to be reflected by an increase in the rolling resistance and thus in the energy consumption.

This is because two conflicting properties exist for tires used in civil engineering. A person skilled in the art knows how to lower the heat of the tread of the tires for civil engineering, by reducing the content of fillers of the composition of the tread. Unfortunately, this decrease in the content of filler results in a deterioration in the wear resistance.

It is known that, in order to obtain the optimum reinforcing properties conferred by a filler in a tire tread and thus a high wear resistance, it is generally advisable for this filler to be present in the elastomeric matrix in a final form which is both as finely divided as possible and as homogeneously distributed as possible. In point of fact, such conditions can only be achieved in so far as this filler exhibits a very good ability, on the one hand, to be incorporated in the matrix during the mixing with the elastomer and to deagglomerate and, on the other hand, to disperse homogeneously in this matrix.

In a known way, carbon black exhibits such abilities, which is not generally the case with inorganic fillers, in particular silicas. This is because, for reciprocal affinity reasons, these inorganic filler particles have an unfortunate tendency to clump together in the elastomeric matrix. These interactions have the harmful consequence of limiting the dispersion of the filler and thus the reinforcing properties to a level substantially lower than that which it would be theoretically possible to achieve if all the (inorganic filler/elastomer) bonds capable of being created during the compounding operation were actually obtained. These interactions moreover tend to increase the consistency in the raw state of the rubber compositions and thus to make them more difficult to process than in the presence of carbon black.

There thus exists a need to have available a filler which introduces the level of hysteresis of silica and the reinforcing nature of a filler, such as carbon black, into rubber compositions.

This is why reinforcing fillers at least partially covered with silica are particularly advantageous, especially reinforcing fillers consisting of carbon black at least partially covered with silica, such as described in particular in the publications WO98/13428 and EP 711 805 B1, or reinforcing fillers consisting of metal oxide at least partially covered with silica, such as described in particular in the publication FR 2 888 243.

The advantage of using fillers covered at the surface with a silica, in particular with a high specific surface, lies mainly in the possibility of increasing the number of bonds of the silica with the elastomer and thus of increasing the level of reinforcement of the latter.

The document EP 0 997 490 discloses compositions for tires used for heavy-duty vehicles which comprise, as reinforcing filler, carbon blacks covered with silica making it possible, with an unvarying filler content, either to improve the rolling resistance with an unvarying wear resistance or to improve the wear resistance with an unvarying rolling resistance.

SUMMARY

The Applicant Company has discovered, surprisingly, that tires used for civil engineering, the tread of which comprises compositions based on diene elastomer and on filler at least partially covered with silica, and exhibiting a very good dispersion of the reinforcing filler in the elastomeric matrix, made it possible simultaneously to obtain tires exhibiting improved thermal properties but also exhibiting improved wear resistance properties.

In order to obtain a good dispersion of the filler in the elastomeric matrix, it is possible in particular to mix the elastomer and the filler in the "liquid" phase. To do this, recourse is had to an elastomer in the latex form, which exists in the form of water-dispersed elastomer particles, and to an aqueous dispersion of the filler, that is to say a filler dispersed in water, commonly referred to as a "slurry". Some processes in particular, such as those described in the document U.S. Pat. No. 6,048,923, make it possible to obtain a masterbatch of elastomer and of filler exhibiting a very good dispersion of the filler in the elastomeric matrix, greatly improved compared to the dispersion of the filler in the elastomeric matrix capable of being obtained during the solid-phase mixing of elastomer and of reinforcing filler, which are also suitable for reinforcing fillers at least partially covered with silica, as shown by the document WO 2012/037244.

A subject-matter of the invention is thus a tire for a heavy vehicle of civil engineering type, intended to be fitted onto a rim, the nominal diameter of which is at least equal to 25 inches, comprising a tread having a radial thickness HT at least equal to 30 mm and having a composition based on at least one diene elastomer, a reinforcing filler predominantly comprising a filler at least partially covered with silica, an agent for coupling the filler to the elastomer and a cross-linking system, characterized in that the dispersion of the filler in the elastomeric matrix has a Z score of greater than or equal to 70.

According to an advantageous alternative embodiment of the invention, the composition constitutes the whole of the tread.

According to another advantageous alternative embodiment of the invention, the tread comprises at least one first radially exterior layer which comes into contact with the ground and a second radially interior layer, the composition constituting one at least of its two layers.

According to another advantageous alternative embodiment of the invention, the tread comprises a first radially exterior layer which comes into contact with the ground, a second radially interior layer and a third layer radially interior to the second layer, the composition constituting one at least of its three layers.

The term "masterbatch" is understood to mean, in that which follows: an elastomer-based composite into which a filler and optionally other additives have been introduced.

I.—MEASUREMENTS AND TESTS

The rubber compositions are characterized, before and after curing, as indicated below.

Dispersion

In a known way, the dispersion of filler in an elastomeric matrix can be represented by the Z score, which is measured, after crosslinking, according to the method described by S. Otto et al. in Kautschuk Gummi Kunststoffe, 58 Jahrgang, NR 7-8/2005, in agreement with Standard ISO 11345.

The calculation of the Z score is based on the percentage of surface area in which the filler is not dispersed ("% undispersed surface area"), as measured by the "disperGRADER+" device supplied, with its procedure and its "disperDATA" operating software, by Dynisco, according to the equation:

$$Z=100-(\% \text{ undispersed surface area})/0.35$$

The percentage of undispersed surface area is, for its part, measured by virtue of a camera which observes the surface of the sample under incident light at 30°. The light points are associated with the filler and with agglomerates, while the dark points are associated with the rubber matrix; digital processing converts the image into a black and white image and makes possible the determination of the percentage of undispersed surface area, as described by S. Otto in the abovementioned document.

The higher the Z score, the better the dispersion of the filler in the elastomeric matrix (a Z score of 100 corresponding to a perfect dispersion and a Z score of 0 to a mediocre dispersion). A Z score of greater than or equal to 80 will be regarded as corresponding to a surface exhibiting a very good dispersion of the filler in the elastomeric matrix.

Dynamic Properties

The dynamic properties, including tan(δ)max, are measured on a viscosity analyser (Metravib V A4000) according to Standard ASTM D 5992-96. The response of a sample of vulcanized composition (cylindrical test specimen with a thickness of 4 mm and a cross section of 400 mm$^2$), subjected to a simple alternating sinusoidal shear stress, at a frequency of 10 Hz, is recorded under the standard temperature conditions according to Standard ASTM D 1349-99. A peak-to-peak strain amplitude sweep is carried out from 0.1% to 50% (outward cycle) and then from 50% to 0.1% (return cycle). The result made use of is the loss factor tan(δ). For the return cycle, the maximum value of tan(δ) observed (tan(δ)max) is indicated. The tan(δ)max values given below are measured at 100° C.

Description of the Wear Resistance Test

The wear resistance tests, or wear tests, are carried out on tires of 15.5R20 size with two tires fitted onto the rear axle of a lorry, inflated to their nominal pressure and subjected to their nominal load, the nominal load and pressure conditions being defined by the usual standards, such as the ETRTO standard. These wear tests are carried out for two tires of a control composition C and for two tires of a composition I according to the invention. These wear tests are carried out, at a mean speed of 24 km/h, on a track covered with gravel of porphyry type of a circuit comprising uphill slopes and downhill slopes. The criterion for halting such a wear test is either the achievement of a minimum level of wear at the tread edge, characterized by a residual tread height equal to 12 mm, or a maximum rolling time, fixed at 1200 hours, for the control composition C. The wear performance, expressed in base 100, of the control is calculated by the ratio of the mean loss in height, measured for the two tires of the control composition C, to the mean loss in height for the two tires of the composition I. An index of greater than 100 indicates an improved wear performance for the tires of composition I, in comparison with the tires of composition C.

II. DETAILED DESCRIPTION OF EXAMPLE EMBODIMENTS

The present invention relates to a tire for a heavy vehicle of civil engineering type comprising a tread having a radial thickness HT at least equal to 30 mm and, especially for large civil engineering vehicles of dumper type, at least equal to 60 mm and having a composition based on at least one diene elastomer, a reinforcing filler predominantly comprising a filler at least partially covered with silica, an agent for coupling the filler to the elastomer and a crosslinking system, characterized in that the dispersion of the filler in the elastomeric matrix has a Z score of greater than or equal to 70.

The expression composition "based on" should be understood as meaning a composition comprising the mixture and/or the reaction product of the various constituents used, some of these base constituents being capable of reacting, or intended to react, with one another, at least in part, during the various phases of manufacture of the composition, in particular during the crosslinking or vulcanization thereof.

In the present description, unless expressly indicated otherwise, all the percentages (%) shown are percentages (%) by weight. Furthermore, any interval of values denoted by the expression "between a and b" represents the range of values extending from more than a to less than b (that is to say, limits a and b excluded), whereas any interval of values denoted by the expression "from a to b" means the range of values extending from a up to b (that is to say, including the strict limits a and b).

The tire for a heavy vehicle of civil engineering type in accordance with the invention exhibits a tread intended to come into contact with the ground via a running surface and having a radial thickness HT at least equal to 30 mm.

This tread in accordance with the invention has a composition based on at least one diene elastomer, a reinforcing filler predominantly comprising a filler at least partially covered with silica, an agent for coupling the filler to the elastomer and a crosslinking system, characterized in that the dispersion of the filler in the elastomeric matrix has a Z score greater than or equal to 70.

This tread can, according to a preferred alternative embodiment, comprise one and the same composition over its entire height but can also, according to another preferred alternative embodiment, comprise a first radially exterior layer which comes into contact with the ground and a second radially interior layer.

Advantageously, the tread can also comprise a third layer, conventionally called "underlayer" by a person skilled in the art, radially interior to the second layer, the thickness of which is much less than that of the first and second layers.

Thus, this tread in accordance with the invention can advantageously comprise this composition over the whole of its thickness or, according to other preferred alternative embodiments of the invention, such a composition can constitute only the first layer of the tread, only the second layer of the tread, only the third layer of the tread or also such a composition can constitute two of its three layers of the tread.

Diene Elastomer

As is normal, the terms "elastomer" and "rubber", which are interchangeable, are used without distinction in the text.

The composition in accordance with the invention comprises at least one first diene elastomer and optionally a second elastomer identical to or different from the first, which thus may or may not be a diene elastomer.

A "diene" elastomer or rubber should be understood, in a known way, as meaning an elastomer resulting at least in part (i.e., a homopolymer or a copolymer) from diene monomers (monomers bearing two conjugated or non-conjugated carbon-carbon double bonds).

These diene elastomers can be classified into two categories: "essentially unsaturated" or "essentially saturated". "Essentially unsaturated" is understood to mean generally a diene elastomer resulting at least in part from conjugated diene monomers having a content of units of diene origin (conjugated dienes) which is greater than 15% (mol %); thus it is that diene elastomers such as butyl rubbers or copolymers of dienes and of α-olefins of EPDM type do not come within the preceding definition and can in particular be described as "essentially saturated" diene elastomers (low or very low content, always less than 15%, of units of diene origin). In the category of "essentially unsaturated" diene elastomers, "highly unsaturated" diene elastomer is understood in particular to mean a diene elastomer having a content of units of diene origin (conjugated dienes) which is greater than 50%.

Among these diene elastomers, a distinction is furthermore made between natural rubber and synthetic elastomers.

By synthetic diene elastomers capable of being used in accordance with the invention, diene elastomer is understood more particularly to mean:

(a)—any homopolymer obtained by polymerization of a conjugated diene monomer having from 4 to 12 carbon atoms;

(b)—any copolymer obtained by copolymerization of one or more conjugated dienes with one another or with one or more vinylaromatic compounds having from 8 to 20 carbon atoms;

(c)—a ternary copolymer obtained by copolymerization of ethylene and of an α-olefin having from 3 to 6 carbon atoms with a non-conjugated diene monomer having from 6 to 12 carbon atoms, such as, for example, the elastomers obtained from ethylene and propylene with a non-conjugated diene monomer of the abovementioned type, such as, in particular, 1,4-hexadiene, ethylidenenorbornene or dicyclopentadiene;

(d)—a copolymer of isobutene and of isoprene (butyl rubber) and also the halogenated versions, in particular chlorinated or brominated versions, of this type of copolymer.

The following are suitable in particular as conjugated dienes: 1,3-butadiene, 2-methyl-1,3-butadiene, 2,3-di($C_1$-$C_5$ alkyl)-1,3-butadienes, such as, for example, 2,3-dimethyl-1,3-butadiene, 2,3-diethyl-1,3-butadiene, 2-methyl-3-ethyl-1,3-butadiene or 2-methyl-3-isopropyl-1,3-butadiene, an aryl-1,3-butadiene, 1,3-pentadiene or 2,4-hexadiene. The following, for example, are suitable as vinylaromatic compounds: styrene, ortho-, meta- or para-methylstyrene, the "vinyltoluene" commercial mixture, para-(tert-butyl)styrene, methoxystyrenes, chlorostyrenes, vinylmesitylene, divinylbenzene or vinylnaphthalene.

The copolymers can contain between 99% and 20% by weight of diene units and between 1% and 80% by weight of vinylaromatic units. The elastomers can have any microstructure, which depends on the polymerization conditions used, in particular on the presence or absence of a modifying and/or randomizing agent and on the amounts of modifying and/or randomizing agent employed. The elastomers can, for example, be block, random, sequential or microsequential elastomers and can be prepared in dispersion or in solution; they can be coupled and/or star-branched or else functionalized by a coupling and/or star-branching or functionalization agent. Mention may for example be made, for coupling to carbon black, of functional groups comprising a C—Sn bond or aminated functional groups, such as aminobenzophenone, for example; mention may for example be made, for coupling to an inorganic filler, such as silica, of silanol or polysiloxane functional groups having a silanol end (such as described, for example, in FR 2 740 778 or U.S. Pat. No. 6,013,718 and WO 2008/141702), alkoxysilane groups (such as described, for example, in FR 2 765 882 or U.S. Pat. No. 5,977,238), carboxyl groups (such as described, for example, in WO 01/92402 or U.S. Pat. No. 6,815,473, WO 2004/096865 or US 2006/0089445) or polyether groups (such as described, for example, in EP 1 127 909 or U.S. Pat. No. 6,503,973, WO 2009/000750 and WO 2009/000752). Mention may also be made, as other examples of functionalized elastomers, of elastomers (such as SBR, BR, NR or IR) of the epoxidized type.

The following are suitable: polybutadienes, in particular those having a content (mol %) of 1,2-units of between 4% and 80% or those having a content (mol %) of cis-1,4-units of greater than 80%, polyisoprenes, butadiene/styrene copolymers and in particular those having a Tg (glass transition temperature (Tg, measured according to ASTM D3418) of between 0° C. and −70° C. and more particularly between −10° C. and −60° C., a styrene content of between 5% and 60% by weight and more particularly between 20% and 50%, a content (mol %) of 1,2-bonds of the butadiene part of between 4% and 75% and a content (mol %) of trans-1, 4-bonds of between 10% and 80%, butadiene/isoprene copolymers, in particular those having an isoprene content of between 5% and 90% by weight and a Tg of −40° C. to −80° C., or isoprene/styrene copolymers, in particular those having a styrene content of between 5% and 50% by weight and a Tg of between −5° C. and −50° C. In the case of butadiene/styrene/isoprene copolymers, those having a styrene content of between 5% and 50% by weight and more particularly of between 10% and 40%, an isoprene content of between 15% and 60% by weight and more particularly of between 20% and 50%, a butadiene content of between 5% and 50% by weight and more particularly of between 20% and 40%, a content (mol %) of 1,2-units of the butadiene part of between 4% and 85%, a content (mol %) of trans-1,4-units of the butadiene part of between 6% and 80%, a content (mol %) of 1,2-plus 3,4-units of the isoprene part of between 5% and 70% and a content (mol %) of trans-1,4-units of the isoprene part of between 10% and 50%, and more generally any butadiene/styrene/isoprene copolymer having a Tg of between −5° C. and −70° C., are suitable in particular.

To summarize, the synthetic diene elastomer or elastomers according to the invention are preferably selected from the group of highly unsaturated diene elastomers consisting of polybutadienes (abbreviated to BRs), synthetic polyisoprenes (IRs), butadiene copolymers, isoprene copolymers and the mixtures of these elastomers. Such copolymers are more preferably selected from the group consisting of butadiene/styrene copolymers (SBRs), isoprene/butadiene copolymers (BIRs), isoprene/styrene copolymers (SIRS) and isoprene/butadiene/styrene copolymers (SBIRs).

As was specified above, liquid-phase compounding processes are preferably used to make it possible to obtain masterbatches based on diene elastomer and on reinforcing filler exhibiting a very good dispersion of the reinforcing filler in the elastomer. Thus, in particular for the preparation of the masterbatch of diene elastomer and of filler at least partially covered with silica, use will more particularly be made of a diene elastomer latex, the elastomer latex being a specific form of the elastomer which exists in the form of water-dispersed elastomer particles.

The invention thus preferably relates to latexes of diene elastomers, the diene elastomers being those defined above.

More particularly, for natural rubber (NR), which is particularly suitable for the invention, this natural rubber exists in various forms, as explained in detail in Chapter 3, "Latex concentrates: properties and composition", by K. F. Gaseley, A. D. T. Gordon and T. D. Pendle in "Natural Rubber Science and Technology", A. D. Roberts, Oxford University Press—1988.

In particular, several forms of natural rubber latex are sold: the natural rubber latices referred to as "field latices", the natural rubber latices referred to as "concentrated natural rubber latices", epoxidized latices (ENRs), deproteinized latices or also prevulcanized latices. The natural rubber field latex is a latex to which ammonia has been added in order to prevent premature coagulation and the concentrated natural rubber latex corresponds to a field latex which has undergone a treatment corresponding to a washing, followed by a further concentration. The various categories of concentrated natural rubber latices are listed in particular according to Standard ASTM D 1076-06. Singled out in particular among these concentrated natural rubber latices are the concentrated natural rubber latices of the grade referred to as: "HA" (high ammonia) and of the grade referred to as "LA"; for the invention, use will advantageously be made of concentrated natural rubber latices of HA grade.

The NR latex can be physically or chemically modified beforehand (centrifugation, enzymatic treatment, chemical modifier, and the like).

The latex can be used directly or be diluted beforehand in water to facilitate the processing thereof.

Thus, as synthetic elastomer latex, the latex can in particular consist of a synthetic diene elastomer already available in the form of an emulsion (for example, a copolymer of butadiene and of styrene, SBR, prepared in emulsion) or consist of a synthetic diene elastomer initially in solution (for example, an SBR prepared in solution) which is emulsified in a mixture of organic solvent and of water, generally by means of a surface-active agent.

An SBR latex, in particular an SBR prepared in emulsion ("ESBR") or an SBR prepared in solution ("SSBR"), and more particularly an SBR prepared in emulsion, is particularly suitable for the invention.

There are two main types of processes for the emulsion copolymerization of styrene and butadiene, one of them, also known as hot process (carried out at a temperature close to 50° C.), being suitable for the preparation of highly branched SBRs, whereas the other, or cold process (carried out at a temperature which can range from 15° C. to 40° C.), makes it possible to obtain more linear SBRs.

For a detailed description of the effectiveness of several emulsifiers which can be used in the said hot process (as a function of the contents of the said emulsifiers), reference may be made, for example, to the two papers by C. W. Carr, I. M. Kolthoff and E. J. Meehan, University of Minnesota, Minneapolis, Minn., which appeared in the Journal of Polymer Science of 1950, Vol. V, No. 2, pp. 201-206, and of 1951, Vol. VI, No. 1, pp. 73-81.

Regarding comparative exemplary embodiments of the said cold process, reference may be made, for example, to the paper in Industrial and Engineering Chemistry, 1948, Vol. 40, No. 5, pp. 932-937, E. J. Vandenberg and G. E. Hulse, Hercules Powder Company, Wilmington, Del., and to the paper in Industrial and Engineering Chemistry, 1954, Vol. 46, No. 5, pp. 1065-1073, J. R. Miller and H. E. Diem, B. F. Goodrich Chemical Co., Akron, Ohio.

In the case of an SBR (ESBR or SSBR) elastomer, use is made in particular of an SBR having a moderate styrene content, for example of between 20% and 35% by weight, or a high styrene content, for example from 35% to 45%, a content of vinyl bonds of the butadiene part of between 15% and 70%, a content (mol %) of trans-1,4-bonds of between 15% and 75% and a Tg of between −10° C. and −55° C.; such an SBR can advantageously be used as a mixture with a BR preferably having more than 90% (mol %) of cis-1, 4-bonds.

It should be noted that it is possible to envisage using one or more natural rubber latices as a blend, one or more synthetic rubber latices as a blend, or a blend of one or more natural rubber latices with one or more synthetic rubber latices.

According to an alternative embodiment of the invention, the composition comprises a second elastomer which may or may not be a diene elastomer; in the latter case, the following are particularly suitable: non-diene butyl elastomers, such as poly(isobutylene) homopolymers or copolymers based on poly(isobutylene) (of course, when it is a question of copolymers with isoprene, the diene elastomers described above are re-encountered), and also the halogenated derivatives, in particular generally brominated or chlorinated derivatives, of these poly(isobutylene) homopolymers and copolymers based on poly(isobutylene).

The non-diene elastomers also suitably include copolymers of isobutylene and of styrene derivatives, such as brominated isobutylene/methylstyrene (BIMS) copolymers, among which is found in particular the elastomer named Exxpro sold by Exxon.

Mention may also be made, as non-diene elastomer particularly suitable for the invention, of non-diene thermoplastic elastomers (TPEs).

Advantageously, the fraction by weight of the first diene elastomer in the elastomeric matrix is greater than or equal to 50% and preferably greater than or equal to 60%.

Fillers

Use is made, as reinforcing filler, of predominantly any filler at least partially covered with silica. Thus, the filler at least partially covered with silica can be composed in particular of a carbon black, metal hydroxides, in particular magnesium or aluminium hydroxides, or crosslinked polymer particles.

The carbon blacks partially or completely covered with silica by a post-treatment, or the carbon blacks modified in situ by silica, such as, non-limitingly, the fillers sold by Cabot Corporation under the name Ecoblack™ CRX 2000 or CRX4000 or CRX2125, or the fillers described in the publications US2003040553 and WO9813428, are particularly suitable.

Such a reinforcing filler preferably contains a content of silica of 10% by weight of the reinforcing filler.

Such fillers can be obtained according to the method of covering carbon black with silica as described in Examples 1 and 2 of Patent Application WO00/05312.

Synthetic metal hydroxides covered with silica, the metal M of which is selected from the group consisting of Al, Fe, Mg, and the mixtures of these metals, are also particularly suitable. M preferably represents Al or Mg, as described in particular in the publications WO06/002993 or WO07/003408.

This filler at least partially covered with silica forms predominantly the reinforcing filler of the composition, that is to say that it forms at least 50% by weight of all of the reinforcing fillers of the composition. It can advantageously form more than 60% by weight of the total reinforcing filler, preferably more than 80% by weight of the total reinforcing filler, more preferably still more than 95% by weight of the total reinforcing filler.

It can be used alone or as a blend with another organic filler, such as carbon black or functionalized polyvinylaromatic organic fillers, such as described in Applications WO-A-2006/069792 and WO-A-2006/069793, and/or one or more reinforcing inorganic fillers, such as silica and/or another filler at least partially covered with silica.

All carbon blacks, in particular blacks of the HAF, ISAF or SAF type, conventionally used in tires ("tire-grade" blacks) are suitable as carbon blacks. Mention will more particularly be made, among the latter, of the reinforcing carbon blacks of the 100, 200 or 300 series (ASTM grades), such as, for example, the N115, N134, N234, N326, N330, N339, N347 or N375 blacks, or else, depending on the applications targeted, the blacks of higher series (for example N660, N683 or N772).

"Reinforcing inorganic filler" should be understood, in the present patent application, by definition, as meaning any inorganic or mineral filler (whatever its colour and its origin, natural or synthetic), also known as "white filler", "clear filler" or indeed even "non-black filler", in contrast to carbon black, capable of reinforcing by itself alone, without means other than an intermediate coupling agent, a rubber composition intended for the manufacture of tires, in other words capable of replacing, in its reinforcing role, a conventional tire-grade carbon black; such a filler is generally characterized, in a known way, by the presence of hydroxyl (—OH) groups at its surface.

The physical state in which the reinforcing inorganic filler is provided is not important, whether it is in the form of a powder, of microbeads, of granules, of beads or any other appropriate densified form. Of course, "reinforcing inorganic filler" is also understood to mean mixtures of different reinforcing inorganic fillers, in particular of highly dispersible siliceous and/or aluminous fillers as described below.

Mineral fillers of the siliceous type, in particular silica (Sift), or of the aluminous type, in particular alumina ($Al_2O_3$), are suitable in particular as reinforcing inorganic fillers. The silica used can be any reinforcing silica known to a person skilled in the art, in particular any precipitated or fumed silica exhibiting a BET specific surface and a CTAB specific surface both of less than 450 $m^2/g$, preferably from 30 to 400 $m^2/g$. Mention will be made, as highly dispersible precipitated silicas ("HDSs"), for example, of the Ultrasil 7000 and Ultrasil 7005 silicas from Degussa, the Zeosil 1165MP, 1135MP and 1115MP silicas from Rhodia, the Hi-Sil EZ150G silica from PPG, the Zeopol 8715, 8745 and 8755 silicas from Huber or the silicas with a high specific surface as described in Application WO 03/16837.

According to an alternative embodiment of the invention, the filler at least partially covered with silica represents at least 60% by weight of the reinforcing filler in the composition.

Preferably, the filler at least partially covered with silica represents at least 80% by weight of the reinforcing filler in the composition, more preferably at least 95% by weight of the total reinforcing filler of the composition.

According to another alternative embodiment of the invention, the filler at least partially covered with silica constitutes the only reinforcing filler of the composition.

Preferably, the content of total reinforcing filler is between 20 and 200 phr, more preferably between 30 and 150 phr and more preferably still between 30 and 100 phr, the optimum being, in a known way, different depending on the specific applications targeted: the level of reinforcement expected with regard to a bicycle tire, for example, is, of course, less than that required with regard to a tire capable of running at high speed in a sustained manner, for example a motorcycle tire, a tire for a passenger vehicle or a tire for a utility vehicle, such as a heavy-duty vehicle.

According to a preferred embodiment of the invention, use is made, as reinforcing filler at least partially covered with silica, of carbon black at least partially covered with silica at a content ranging from 25 to 90 phr, and this can preferably be combined with an organic filler, especially carbon black, or an inorganic filler, especially silica, the content of which ranges from 1 to 50 phr, more particularly the total filler of the composition comprising carbon black at least partially covered with silica, the content of which ranges from 30 to 75 phr, and an organic filler, especially carbon black, or an inorganic filler, especially silica, the content of which ranges from 1 to 30 phr.

According to another preferred alternative form of the invention, the composition comprises solely carbon black at least partially covered with silica at a content ranging from 25 to 90 phr, and more preferably the content varies from 30 to 75 phr.

According to a preferred embodiment of the invention, in order to couple the filler at least partially covered with silica, indeed even a reinforcing inorganic filler, if appropriate, to the diene elastomer, use is made of an at least bifunctional coupling agent (or bonding agent) intended to provide a satisfactory connection, of chemical and/or physical nature, between the inorganic filler (surface of its particles) and the diene elastomer. Use is made in particular of organosilanes or polyorganosiloxanes which are at least bifunctional.

Use is made in particular of silane polysulfides, referred to as "symmetrical" or "asymmetrical" depending on their specific structure, such as described, for example, in Applications WO 03/002648 (or US 2005/016651) and WO 03/002649 (or US 2005/016650).

Suitable in particular, without the definition below being limiting, are silane polysulfides corresponding to the following general formula (I):

$$Z\text{-}A\text{-}S_x\text{-}A\text{-}Z, \quad (I)$$

in which:
x is an integer from 2 to 8 (preferably from 2 to 5);
the A symbols, which are identical or different, represent a divalent hydrocarbon radical (preferably a $C_1$-$C_{18}$ alkylene group or a $C_6$-$C_{12}$ arylene group, more particularly a $C_1$-$C_{10}$, in particular $C_1$-$C_4$, alkylene, especially propylene);
the Z symbols, which are identical or different, correspond to one of the three formulae below:

in which:
the $R^1$ radicals, which are substituted or unsubstituted and identical to or different from one another, represent a $C_1$-$C_{18}$ alkyl, $C_5$-$C_{18}$ cycloalkyl or $C_6$-$C_{18}$ aryl group (preferably $C_1$-$C_6$ alkyl, cyclohexyl or phenyl groups, in particular $C_1$-$C_4$ alkyl groups, more particularly methyl and/or ethyl);
the $R^2$ radicals, which are substituted or unsubstituted and identical to or different from one another, represent a $C_1$-$C_{18}$ alkoxyl or $C_5$-$C_{18}$ cycloalkoxyl group (preferably a group chosen from $C_1$-$C_8$ alkoxyls and $C_5$-$C_8$ cycloalkoxyls, more preferably still a group chosen from $C_1$-$C_4$ alkoxyls, in particular methoxyl and ethoxyl).

In the case of a mixture of alkoxysilane polysulfides corresponding to the above formula (I), in particular normal commercially available mixtures, the mean value of the "x" indices is a fractional number preferably of between 2 and 5, more preferably of approximately 4. However, the invention can also advantageously be carried out, for example, with alkoxysilane disulfides (x=2).

Mention will more particularly be made, as examples of silane polysulfides, of bis(($C_1$-$C_4$)alkoxyl($C_1$-$C_4$)alkylsilyl ($C_1$-$C_4$)alkyl) polysulfides (in particular disulfides, trisulfides or tetrasulfides), such as, for example, bis(3-trimethoxysilylpropyl) or bis(3-triethoxysilylpropyl) polysulfides. Use is made in particular, among these compounds, of bis(3-triethoxysilylpropyl) tetrasulfide, abbreviated to TESPT, of formula $[(C_2H_5O)_3Si(CH_2)_3S_2]_2$, or bis(3-triethoxysilylpropyl) disulfide, abbreviated to TESPD, of formula $[(C_2H_5O)_3Si(CH_2)_3S]_2$. Mention will also be made, as preferred examples, of bis(mono($C_1$-$C_4$)alkoxyldi($C_1$-$C_4$) alkylsilylpropyl) polysulfides (in particular disulfides, trisulfides or tetrasulfides), more particularly of bis(monoethoxydimethylsilylpropyl) tetrasulfide, such as described in the abovementioned Patent Application WO 02/083782 (or U.S. Pat. No. 7,217,751).

Mention will in particular be made, as examples of coupling agents other than an alkoxysilane polysulfide, of bifunctional POSs (polyorganosiloxanes), or else of hydroxysilane polysulfides ($R^2$=OH in the above formula I), such as described, for example, in Patent Applications WO 02/30939 (or U.S. Pat. No. 6,774,255), WO 02/31041 (or US 2004/051210) and WO2007/061550, or else of silanes or POSs bearing azodicarbonyl functional groups, such as described, for example, in Patent Applications WO 2006/125532, WO 2006/125533 and WO 2006/125534.

Mention will be made, as examples of other silane sulfides, for example, of silanes bearing at least one thiol (—SH) functional group ("mercaptosilanes") and/or at least one blocked thiol functional group, such as described, for example, in the patents or patent applications U.S. Pat. No. 6,849,754, WO 99/09036, WO 2006/023815, WO 2007/098080, WO 2010/072685 and WO 2008/055986.

Of course, use might also be made of mixtures of the coupling agents described above, as described in particular in the abovementioned Application WO 2006/125534.

The content of coupling agent is advantageously less than 20 phr, it being understood that it is generally desirable to use as little as possible of it. Typically, the content of coupling agent represents from 0.05% to 10% by weight, with respect to the amount of reinforcing inorganic filler, preferably from 0.1% to 7% by weight and more preferably still from 0.2% to 5% by weight.

This content is easily adjusted by a person skilled in the art according to the content of filler used in the composition.

It should be noted that, according to another preferred embodiment of the invention, the composition does not comprise an agent for coupling the filler at least partially covered with silica to the diene elastomer of the composition.

These compositions can also comprise, in addition to the coupling agents, coupling activators, covering agents (for example comprising the Y functional group alone) for the reinforcing inorganic filler or more generally processing aids capable, in a known way, by virtue of an improvement in the dispersion of the inorganic filler in the rubber matrix and of a lowering in the viscosity of the compositions, of improving their ease of processing in the raw state, these processing aids being, for example, hydrolysable silanes, such as alkylalkoxysilanes (in particular alkyltriethoxysilanes), polyols, polyethers (for example, polyethylene glycols), primary, secondary or tertiary amines (for example, trialkanolamines), hydroxylated or hydrolysable POSs, for example α,ω-dihydroxypolyorganosiloxanes (in particular α,ω-dihydroxypolydimethylsiloxanes), or fatty acids, such as, for example, stearic acid.

Other Possible Additives

The rubber compositions in accordance with the invention optionally also comprise all or a portion of the normal additives customarily used in elastomer compositions intended in particular for the manufacture of treads, such as, for example, pigments, protective agents, such as antiozone waxes, chemical antiozonants or antioxidants, anti-fatigue agents, reinforcing resins, methylene acceptors (for example, phenolic novolak resin) or methylene donors (for example, HMT or $H_3M$).

According to a preferred embodiment, the composition according to the invention comprises less than 15 phr of plasticizing agents, preferably less than 5 phr, and more preferably still the composition is devoid of plasticizing agents. The plasticizing agents conventionally used in such compositions are solid hydrocarbon resins (or plasticizing resin), extender oils (or plasticizing oil) or the mixture of the two.

Crosslinking System

The crosslinking system is preferably a vulcanization system, that is to say a system based on sulfur (or on a sulfur-donating agent) and on a primary vulcanization accelerator. Additional to this base vulcanization system are various known secondary vulcanization accelerators or vulcanization activators, such as zinc oxide, stearic acid or equivalent compounds, or guanidine derivatives (in particular diphenylguanidine), incorporated during the first non-productive phase and/or during the productive phase, as described subsequently.

The sulfur is used at a preferred content of between 0.5 and 12 phr, in particular between 1 and 10 phr. The primary vulcanization accelerator is used at a preferred content of between 0.5 and 10 phr, more preferably of between 0.5 and 5.0 phr.

Use may be made, as (primary or secondary) accelerator, of any compound capable of acting as accelerator for the vulcanization of diene elastomers in the presence of sulfur, in particular accelerators of the thiazole type, and also their derivatives, or accelerators of thiuram or zinc dithiocarbamate types. These accelerators are, for example, selected from the group consisting of 2-mercaptobenzothiazyl disulfide (abbreviated to "MBTS"), tetrabenzylthiuram disulfide ("TBZTD"), N-cyclohexyl-2-benzothiazolesulfenamide ("CBS"), N,N-dicyclohexyl-2-benzothiazolesulfenamide ("DCBS"), N-(tert-butyl)-2-benzothiazolesulfenamide ("TBBS"), N-(tert-butyl)-2-benzothiazolesulfenimide ("TBSI"), zinc dibenzyldithiocarbamate ("ZBEC") and the mixtures of these compounds. Preferably, use is made of a primary accelerator of the sulfenamide type.

Manufacture of the Rubber Compositions

The rubber compositions of the invention are manufactured in appropriate mixers, using two successive phases of preparation according to a general procedure well known to a person skilled in the art: a first phase of thermomechanical working or kneading (sometimes described as "non-productive" phase) at high temperature, up to a maximum temperature of between 130° C. and 200° C., preferably between 145° C. and 185° C., followed by a second phase of mechanical working (sometimes described as "productive" phase) at a lower temperature, typically of less than 120° C., for example between 60° C. and 100° C., during which finishing phase the crosslinking or vulcanization system is incorporated.

According to a preferred embodiment of the invention, all the base constituents of the compositions of the invention, with the exception of the vulcanization system, are intimately incorporated, by kneading, during the first "non-productive" phase, that is to say that at least these various base constituents are introduced into the mixer and are thermomechanically kneaded, in one or more stages, until the maximum temperature of between 130° C. and 200° C., preferably of between 145° C. and 185° C., is reached.

According to a preferred embodiment of the invention, the diene elastomer and the filler at least partially covered with silica are mixed with the base constituents of the compositions of the invention, with the exception of the vulcanization system, in the form of a masterbatch which was prepared beforehand.

Preferably, this masterbatch is produced in the "liquid" phase. To do this, recourse has been had to the diene elastomer in the form of a latex, which exists in the form of elastomer particles dispersed in water, and to an aqueous dispersion of the filler at least partially covered with silica, that is to say a filler dispersed in water, commonly known as "slurry". More preferably still, the stages of the process described in the document U.S. Pat. No. 6,048,923 will be followed, which process consists in particular in incorporating a continuous stream of a first fluid composed of the elastomer latex in the compounding region of a coagulation reactor, in incorporating a second continuous stream of a second fluid composed of the aqueous dispersion of the filler under pressure in the compounding region, in order to form a mixture with the elastomer latex; the compounding of these two fluids being sufficiently energetic to make it possible to virtually completely coagulate the elastomer latex with the filler before the outlet orifice of the coagulation reactor, and in then drying the coagulum obtained.

It should in particular be noted that, in the case of the incorporation of a second elastomer and/or of a second organic or inorganic filler, this or these incorporations can be carried out simultaneously with the introduction into the mixer of the other constituents (in particular the masterbatch) but also advantageously that this or these incorporations can be offset in time from a few tens of seconds to a few minutes.

It should be noted that, in the case of an addition of an organic or inorganic filler and of a second elastomer, these can be introduced separately or in the form of a second masterbatch containing the second elastomer and the organic or inorganic filler. In the case of the introduction of the second elastomer alone and of the organic or inorganic filler alone, offset in time from a few tens of seconds to a few minutes, the organic or inorganic filler can be introduced before, after or simultaneously with the second elastomer.

By way of example, the first (non-productive) phase is carried out in a single thermomechanical stage during which all the necessary constituents (if appropriate in the form of a masterbatch as specified above) and various other additives, with the exception of the vulcanization system, are introduced into an appropriate mixer, such as a standard internal mixer. The total duration of the kneading, in this non-productive phase, is preferably between 1 and 15 min. After cooling the mixture thus obtained during the first non-productive phase, the vulcanization system is then incorporated at low temperature, generally in an external mixer, such as an open mill; everything is then mixed (productive phase) for a few minutes, for example between 2 and 15 min.

The final composition thus obtained is subsequently calendered, for example in the form of a sheet or of a plaque, in particular for a laboratory characterization, or also extruded in the form of a rubber profiled element installed generally in the form of a strip in order to constitute a tread for tires used in civil engineering.

III. EXEMPLARY EMBODIMENTS

Preparation of the Rubber and Tire Compositions

The control compositions C1, C2 and C3 are produced according to a conventional compounding process (described below) in the solid form in which the diene elastomer and the reinforcing filler are introduced in the solid form.

The control rubber compositions C4 and C5 not in accordance with the invention and the composition I1 in accordance with the invention are produced according to the compounding process described below but in which the diene elastomer and the reinforcing filler were prepared beforehand in the form of a masterbatch A.

The masterbatch A comprising natural rubber and a filler (carbon black, silica or black covered with silica) is produced in the liquid phase according to the process described in U.S. Pat. No. 6,048,923.

Thus, a masterbatch is prepared, according to the protocol described in detail in the abovementioned patent, from an aqueous dispersion of filler and from natural rubber field latex originating from Malaysia and exhibiting a rubber solids content of 28% and an ammonia content of 0.3%.

A masterbatch A of natural rubber and of filler is thus obtained in which the filler content is 50 phr.

The compounding process used for the different compositions is as follows.

The tests which follow are carried out in the following way: the masterbatch A for the compositions C4, C5 and I1, or the natural rubber in the solid form and the reinforcing filler for the compositions C1, C2 and C3, are introduced into an internal mixer, which is 70% filled and the initial vessel temperature of which is approximately 90° C., followed, after kneading for one to two minutes, by the various other ingredients, with the exception of the vulcanization system. Thermomechanical working (non-productive phase) is then carried out in one stage (total duration of the kneading equal to approximately 5 min), until a maximum "dropping" temperature of approximately 165° C. is reached.

The mixture thus obtained is recovered and cooled and then the vulcanization system (sulfur and sulfenamide accelerator) is added on an external mixer (homofinisher) at 70° C., everything being mixed (productive phase) for approximately 5 to 6 min. During the presence of covering agent, the latter can also be introduced on the external mixer instead of being introduced on an internal mixer.

The compositions thus obtained are subsequently calendered, either in the form of plaques (thickness of 2 to 3 mm) or of thin sheets of rubber, for the measurement of their physical or mechanical properties, or in the form of profiled elements which can be used directly, after cutting and/or assembling to the desired dimensions, for example as semi-finished products for tires, in particular as tire treads.

Tires of 15.5R20 size were manufactured with treads having the compositions C1, C2, C3, C4, C5 and I1 (respectively two tires for each type of composition).

Tests

The purpose of these tests is to demonstrate the significantly improved properties of rolling resistance and of wear resistance of a tire in accordance with the invention, with regard to control tires not in accordance with the invention, as a result of their formulation and/or of their preparation process.

The rubber compositions C1 to C3 are thus prepared "in bulk" and the compositions C4, C5 and I1 are prepared from the masterbatch A; they differ from one another as follows:

the composition C1, not in accordance with the invention, comprises predominantly carbon black as reinforcing filler, the composition C2, not in accordance with the invention, comprises predominantly silica as reinforcing filler, the composition C3, not in accordance with the invention, comprises predominantly carbon black covered with silica as reinforcing filler, the composition C4, not in accordance with the invention, has a formulation identical to the composition C1, the composition C5 has a formulation identical to the composition C2 except for the fact that magnesium salt was added during the preparation of the masterbatch of silica and of natural rubber, in order to make it possible for them to coagulate, in accordance with the process described in the document WO2013/053733, the composition I1, in accordance with the invention, has a formulation identical to the composition C3.

The constituents of the compositions C1 to C5 and I1 are presented in the Table 1 which follows, in which the contents are shown in parts by weight per hundred parts of elastomers, phr.

TABLE 1

| Composition | C1 | C2 | C3 | C4 | C5 | I1 |
| --- | --- | --- | --- | --- | --- | --- |
| Natural rubber | 100 | 100 | 100 | 100 | 100 | 100 |
| Carbon black (1) | 50 | 2 | — | 50 | 2 | — |
| Silica (2) | — | 48 | — | — | 48 | — |
| Black covered with silica (3) | — | — | 50 | — | — | 50 |
| Coupling agent (4) | — | 4.7 | 4.7 | — | 4.7 | 4.7 |
| Antioxidant (5) | 1.5 | 1.5 | 1.5 | 1.5 | 1.5 | 1.5 |
| Paraffin | 1 | 1 | 1 | 1 | 1 | 1 |
| Stearic acid | 1 | 1 | 1 | 1 | 1 | 1 |
| ZnO (6) | 2.7 | 2.7 | 2.7 | 2.7 | 2.7 | 2.7 |
| CBS (7) | 1.7 | 1.7 | 1.7 | 1.7 | 1.7 | 1.7 |
| Sulfur | 1.2 | 1.2 | 1.2 | 1.2 | 1.2 | 1.2 |

(1) N134, sold by Cabot Corporation
(2) Precipitated silica, Zeosil 1165MP, sold by Solvay
(3) CRX2125, sold by Cabot Corporation
(4) Bis(3-triethoxysilylpropyl) tetrasulfide, TESPT, SI69, sold by Evonik
(5) N-(1,3-Dimethylbutyl)-N-phenyl-para-phenylenediamine, Santoflex 6-PPD, sold by Flexsys
(6) Industrial grade zinc oxide, sold by Umicore
(7) N-Cyclohexyl-2-benzothiazolesulfenamide, Santocure CBS, sold by Flexsys The properties measured for these compositions after curing at 150° C. for 40 minutes are given in Table 2 which follows, as is the wear test carried out on tires comprising these compositions as tread.

TABLE 2

| Composition | C1 | C2 | C3 | C4 | C5 | I1 |
| --- | --- | --- | --- | --- | --- | --- |
| Properties after curing | | | | | | |
| Z score | 52 | 55 | 35 | 85 | 80 | 88 |
| $Tan\delta_{max\ return}$ | 0.126 | 0.080 | 0.085 | 0.082 | 0.072 | 0.062 |
| Wear test | | | | | | |
| Wear performance | 100 | 109 | 105 | 101 | 109 | 117 |

It is observed, as expected, that the compositions C4, C5 and I1 prepared from a masterbatch A produced in the liquid phase exhibit a greatly improved dispersion of the filler in the elastomeric matrix in comparison with those respectively of the compositions prepared in bulk C1, C2 and C3. The difference is less marked with the compositions C4 and C5 with regard to the compositions C1 and C2 than between the compositions C3 and I1 comprising carbon black covered with silica, which represents, in a way known to a person skilled in the art, a filler which is more difficult to employ.

It is also observed that the compositions C4, C5 and I1, which exhibit a very good dispersion of the filler in the composition, exhibit a significantly reduced hysteresis in comparison with the compositions prepared in bulk C1, C2 and C3. However, it is surprising to observe that the composition I1 in accordance with the invention exhibits not only the greatest difference, with respect to a composition having a much poorer dispersion, but also a hysteresis which is much lower than all the other compositions also exhibiting very good dispersion of the filler in the composition. This low hysteresis of the composition foretells an improved rolling resistance in the tire comprising such a composition.

Furthermore, it is observed that, for the compositions based on carbon black or on silica, the dispersion of the filler in the composition does not affect the wear performance of tires having treads consisting of these compositions (identical or virtually identical performance index between C1 and C4 and between C2 and C5) whereas passing from the composition C3 to the composition I1 makes it possible, entirely surprisingly, to very significantly improve the wear resistance of the tire having a tread consisting of this composition I1.

Thus, an unexpected synergy is demonstrated for the combination of a filler covered with silica with its very good dispersion of the composition, for obtaining a tire for a heavy vehicle of civil engineering type exhibiting both improved rolling resistance and improved wear resistance properties.

The invention claimed is:

1. A tire configured for a heavy vehicle of civil engineering type, the nominal diameter of the tire being at least equal to 25 inches, the tire comprising: a tread having a radial thickness HT at least equal to 30 mm, and the tread having a composition based on at least one diene elastomer, a reinforcing filler predominantly comprising a filler at least partially covered with silica, an agent for coupling the filler to the at least one diene elastomer and a crosslinking system, wherein the at least one diene elastomer and the reinforcing filler predominantly comprising a filler at least partially covered with silica are mixed in order to form a masterbatch, and the dispersion of the filler in the elastomeric matrix has a Z score of greater than or equal to 70, the Z score being measured according to the method described by S. Otto et al. in Kautschuk Gummi Kunststoffe, 58 Jahrgang, NR 7-8/2005, and in agreement with Standard ISO 11345.

2. A tire according to claim 1, in which the composition constitutes the whole of the tread.

3. A tire according to claim 1, in which the tread comprises at least one first radially exterior layer which comes into contact with the ground and a second radially interior layer, the composition is present in at least of the two layers.

4. A tire according to claim 1, in which the tread comprises a first radially exterior layer which comes into contact with the ground, a second radially interior layer and a third layer radially interior to the second layer, the composition is present in at least of the three layers.

5. A tire according to claim 1, in which the filler at least partially covered with silica constitutes at least 60% by weight of the total reinforcing filler of the composition.

6. A tire according to claim 1, in which the filler at least partially covered with silica constitutes at least 80% by weight of the total reinforcing filler of the composition.

7. A tire according to claim 1, in which the filler at least partially covered with silica is chosen from carbon black, metal hydroxides, and crosslinked polymer particles.

8. A tire according to claim 7, in which the filler covered at least partially by silica consists of carbon black.

9. A tire according to claim 1, in which the filler at least partially covered with silica is used with a content varying from 25 to 90 phr in the composition.

10. A tire according to claim 1, in which the filler at least partially covered with silica is used as a blend with carbon black in the composition.

11. A tire according to claim 1, in which the filler at least partially covered with silica is used as a blend with silica in the composition.

12. A tire according to claim 10, in which the total content of reinforcing filler of the composition varies from 30 to 75 phr, the content of carbon black varying from 1 to 30 phr.

13. A tire according to claim 1, in which the diene elastomer of the composition is selected from the group consisting of polybutadienes, natural rubber, synthetic polyisoprenes, butadiene copolymers, isoprene copolymers and mixtures of these elastomers.

14. A tire according to claim 13, in which the diene elastomer is a natural rubber.

15. A tire according to claim 1, which comprises less than 15 phr of plasticizing agents.

16. A tire according to claim 1, in which the filler at least partially covered with silica constitutes at least 95% by weight of the total reinforcing filler of the composition.

17. A tire according to claim 11, in which the total content of reinforcing filler of the composition varies from 30 to 75 phr, the content of silica varying from 1 to 30 phr.

18. A tire according to claim 1, which comprises less than 5 phr of plasticizing agents.

* * * * *